United States Patent [19]

Katayama et al.

[11] Patent Number: 5,077,714
[45] Date of Patent: Dec. 31, 1991

[54] MAGNETO-OPTICAL RECORDING AND REPRODUCING DEVICE USING THE MODULATION OF INTENSITIES OF THE MAGNETIC FIELD AND LIGHT BEAM

[75] Inventors: Hiroyuki Katayama; Kenji Ohta; Junichiro Nakayama, all of Nara; Tomoyuki Miyake, Tenri; Akira Takahashi, Nara, all of Japan

[73] Assignee: Sharp Kabushiki Kaisha, Osaka, Japan

[21] Appl. No.: 340,771

[22] Filed: Apr. 20, 1989

[30] Foreign Application Priority Data

Apr. 20, 1988 [JP] Japan ............................ 63-97487

[51] Int. Cl.$^5$ .......................................... G11B 11/14
[52] U.S. Cl. .................................. 369/13; 369/100; 360/114
[58] Field of Search ................ 369/13, 14, 100, 275.1, 369/116; 360/114, 59; 365/122

[56] References Cited

U.S. PATENT DOCUMENTS

| 4,712,203 | 12/1987 | Saito et al. | 360/114 |
| 4,879,703 | 11/1989 | Kaku et al. | 369/13 |
| 4,882,718 | 11/1989 | Kyrder et al. | 369/13 |
| 4,982,389 | 1/1991 | Nakao et al. | 369/13 |
| 4,985,881 | 1/1991 | Saito et al. | 369/13 |

Primary Examiner—Roy N. Envall, Jr.
Assistant Examiner—Thang V. Tran

[57] ABSTRACT

A magneto-optical recording and reproducing device for recording and reproducing data determined by negative magnetized areas in a magneto-optical recording medium. The device including a laser beam output level control means for controlling the intensity of a laser beam when recording data on the medium. The device prevents the causes of false signals and incorrect detection influenced by residual negative magnetized domains by increasing laser beam intensity when rewriting positive magnetized areas to erase residual negative magnetized areas.

9 Claims, 4 Drawing Sheets

MAGNETO-OPTICAL RECORDING AND REPRODUCING DEVICE USING THE MODULATION OF INTENSITIES OF THE MAGNETIC FIELD AND LIGHT BEAM

FIELD OF THE INVENTION

This invention relates to a magneto-optical recording and reproducing device which records, reproduces and erases data by laser beam spot emission to a magneto-optical recording medium.

BACKGROUND OF THE INVENTION

With reference to FIG. 5, conventional magneto-optical recording and reproducing devices (31) use a magneto-optical recording medium (21) composed of a laminated magnetic substance film (21b) having perpendicular magnetic anisotropy, and a protective film (21c) on the rear side of a substrate (21a). To record data to this magneto-optical recording medium (21), the magneto-optical recording and reproducing device (31) comprises the following components: a data generator (29), which outputs data to be recorded, a magnetic coil driver (28), which outputs a modulated control signal based on data from the data generator (29), a magnetic coil (27), which is driven by the control signal from the magnetic coil driver (28) and generates an alternating magnetic field, and a optical head (30), which emits a laser beam spot to the above mentioned magneto-optical recording medium (21).

The optical head (30) is equipped with a laser beam source (22) that emits a laser beam, a condensing lens (24), which projects the laser beam spot on the magnetic substance film (21b) of the magneto-optical recording medium (21) by condensing the laser beam, a beam splitter (23) which changes the advancing direction of reflected-light from the magneto-optical recording medium (21) and leads the light to a photodetector (25), and a photodetector (25), that detects the reflected-light strength and other data. The laser beam source (22) of the optical head (30) is steady DC driven by the laser driver (26).

When data is recorded to the magneto-optical recording medium (21) by such a magneto-optical recording and reproducing device (31), the laser beam emitted from the laser beam source (22) is condensed on the magnetic substance film (21b) of the magneto-optical recording medium (21) by way of the beam splitter (23), condensing lens (24), and the substrate (21a) of the magneto-optical recording medium (21). The laser beam spot is focused onto this magnetic substance film (21b).

Thereafter at the local area of the magnetic substance film (21b) of the magneto-optical recording medium (21) onto which the laser beam has been focused, the coercive force is reduced as the local area temperature rises, and the magnetizing direction becomes easy to change.

Therefore, if the alternating magnetic field, based on coded data output from the data generator (29) is generated by magnetic coil (27), the positive magnetized area (61-63), composed of a positively magnetized part, previously magnetized in a fixed direction at width $d_0$, and the negative magnetized area (64-65), composed of a negatively magnetized part magnetized in the opposite direction to the positive magnetized area (61-63) onto the laser beam spot area, are formed on the magnetic substance film (21b) of the magneto-optical recording medium (21). This is shown in FIG. 6. Data recording and reproducing is done in accordance with the existence or absence of this negative magnetized part, that is, in accordance with the existence or absence, length, and location of the negative magnetized area (64-65).

However, the width of the positive magnetized area (61-63) and the negative magnetized area (64-65) formed on the magnetic substance film (21b) of the magneto-optical recording medium (21), changes. This change is due to changes of the laser beam output level emitted from the laser beam source (22) and changes in the magneto-optical recording medium's (21) sensitivity, or the like. Consequently, the width is not always the same.

For example as shown in FIG. 7, when recording new data, called "rewriting", to a data area recorded as having a width $d_0$ for the positive magnetized area (61-63) and the negative magnetized area (64-65), the width $d_1$ of the positive magnetized area (71-72) and the negative magnetized area (73-74), formed by new data, may become smaller than the width $d_0$ of the previously written data in the positive magnetized area (61-63) and the negative magnetized area (64-65).

In this example, the residual positive magnetized area (61a-63a) and the residual negative magnetized area (64a-65a) exist on the magnetic substance film (21b) of the magneto-optical recording medium (21), mixed with the positive magnetized area (71-72) and the negative magnetized area (73-74) formed by recording new data. The residual area is larger in width than $d_1$ of the positive magnetized area (71-72) and the negative magnetized area (73-74), located in the already written positive magnetized area (61-63) and the negative magnetized area (64-65).

The magneto-optical recording and reproducing device (31) reads and reproduces data in accordance with the existence or absence of the negative magnetized part, that is, or the existence or absence, length, and location, of the negative magnetized area. Considering the above example, when written data is reproduced by the magneto-optical recording and reproducing device (31), the residual negative magnetized area (64a-65a) which is a part of the negative magnetized area (64-65) formed based on old data, can possibly be reproduced as a negative magnetized area that exists a negative magnetized parts, together with the negative magnetized area (73-74) formed based on new data.

In particular, in a means where the signal data is recorded in accordance with the length of the negative magnetized area, a pulse width modulation (PWM) for example, since the negative magnetized area edge position is important, if such residual negative magnetized areas (64a-65a) exist, as above mentioned, this may result in the false signal generation or the incorrect detection.

Therefore conventional magneto-optical recording and reproducing devices have the problem reduced data recordation and reproduction reliability.

SUMMARY OF THE INVENTION

It is a primary object of the present invention to present a magneto-optical recording and reproducing device that does not leave a part of the already written negative magnetized area on both sides of the newly written positive magnetized area, even though the width of the positive and the negative magnetized areas formed on the magnetic substance film (21b) of the magneto-optical recording medium (21) change, due to changes in laser beam emission output levels from a laser beam source and changes in the magneto-optical recording medium sensitivity.

Another object of the invention is to present a magneto-optical recording and reproducing device structured such that the false signal and error detection are not influenced by a residual negative magnetized areas, which are part of the negative magnetized area formed based on old data, when the recorded data is reproduced, based on the existence or absence of negative magnetized parts, that is, the existence or absence, length, and position, of the negative magnetic area.

Still another object of the invention is to present a magneto-optical recording and reproducing device with greatly improved data reading and writing reliability.

In order to accomplish these objects the magneto-optical recording and reproducing device related to this invention is equipped with a laser beam source, an optical head that focuses a laser beam onto a magneto-optical recording medium having a magnetic substance film with perpendicular magnetic anisotropy, and a magnetic coil that generates an alternating magnetic field based on the data to be recorded. The device forms a positive magnetized part which is magnetized in a fixed direction on the magnetic substance film of the magneto-optical recording medium, and a negative magnetized part which is magnetized in the direction opposite to that of the positive magnetized parts. The magneto-optical recording and reproducing device reads and reproduces data based on the existence or absence of this negative magnetized part.

Also, the magneto-optical recording and reproducing device is equipped with a laser beam output level control means. The laser beam output level control means controls the laser beam source output level for forming the positive magnetized part higher than the laser than when forming the negative magnetized parts so that the width of the positive magnetized parts becomes wider than that of the negative magnetized parts when the data is recorded.

The above mentioned laser beam output level control, as part of the laser driver, drives the laser beam source. The laser beam output level control, drives the laser beam source for inputting and controlling of data recordation to the magneto-optical recording medium from the data generator into the laser driver, so that, when the data is recorded, the width of the positive magnetizing parts becomes wider than that of the negative magnetizing parts. The magneto-optical recording medium used with the magneto-optical recording and reproducing device, for example, comprises a substrate, perpendicular anisotropic magnetic film formed on the rear side of the substrate, and a protective film covering the magnetic substance film. The optical head, for example, comprises a laser beam source which emits the laser beam, a condensing lens which focuses the laser beam on the magnetic substance film of the magneto-optical recording medium by condensing the laser beam, a beam splitter which changes the advancing direction of the light reflected from the magneto-optical recording medium, and a photodetector which detects the strength (i.e., intensity) of the light reflected delivered through the beam splitter.

The magneto-optical recording and reproducing device related to this invention is also equipped with a data generator for outputting data to be recorded to the magneto-optical recording medium, a magnetic coil driver for outputting a modulated control signals based on data output from the data generator, a magnetic coil for generating an alternating magnetic field driven by the control signal output from the magnetic coil driver, an optical head which for emitting a laser beam onto the magneto-optical recording medium, and a laser driver for driving the laser beam source of the optical head. Also, the laser driver in which the data output from the data generator is input, is equipped with the laser beam source output level control means for controlling the laser beam source output level when forming the positive magnetizing parts higher than that when forming the negative magnetized parts, so that, when the data is recorded to the magneto-optical recording medium, the width of the positive magnetized area, formed by the magnetic substance film of the magneto-optical recording medium being magnetized in a fixed direction, becomes wider than the width of the negative magnetized parts, formed by being magnetized in a direction opposite to that of the positive magnetized parts.

Given this structure, the laser beam output level is controlled so that the laser source output level when forming the positive magnetized parts is higher than the output level when forming the negative magnetized parts. Hence, when new data recording is to be done in an area where the positive or negative magnetized areas have already been recorded to, the width of the newly recorded positive magnetized area always becomes wider than the width of the already recorded negative magnetized area.

DESCRIPTION OF THE EMBODIMENTS

Figure 1:
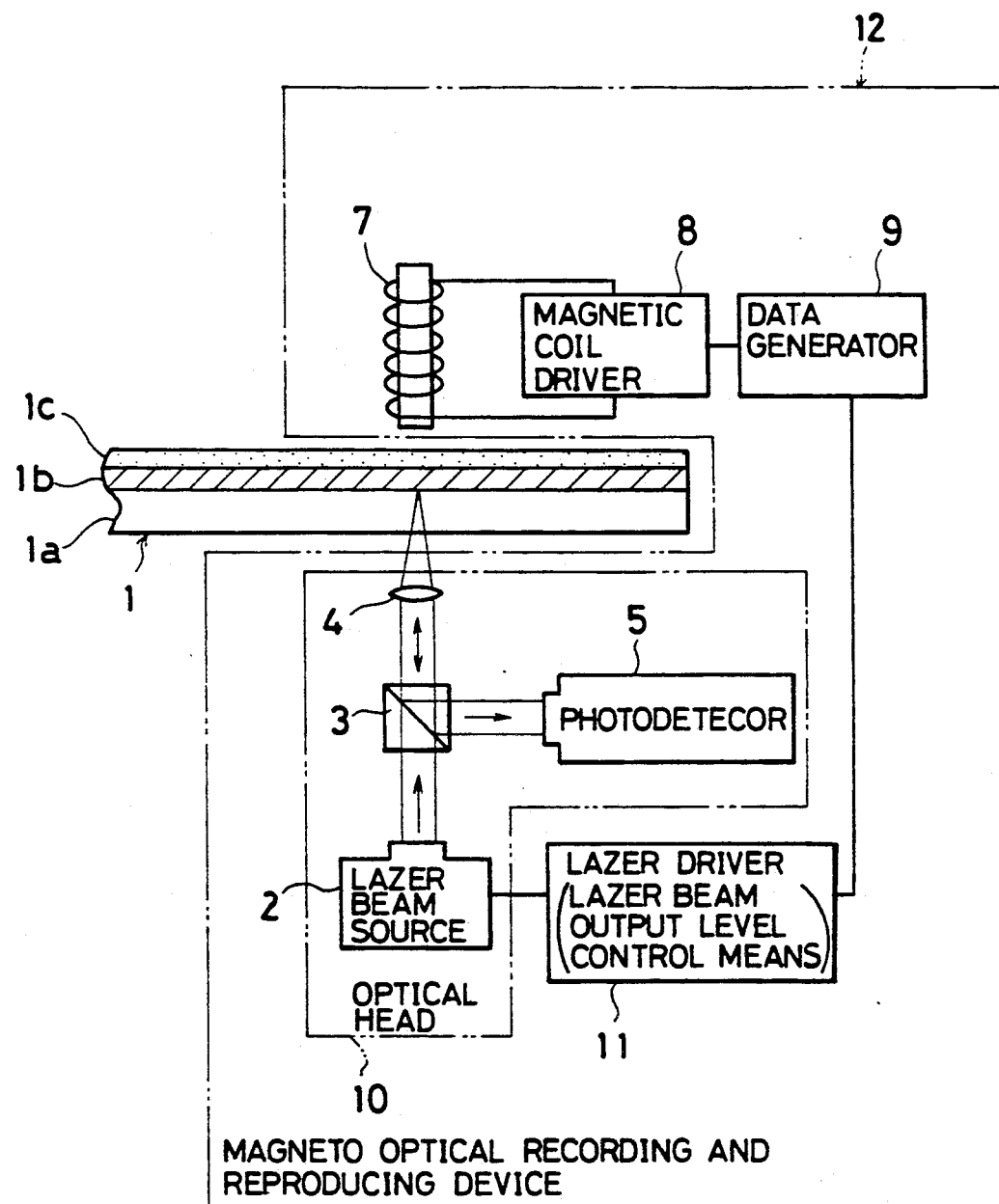
FIG. 1 is an illustrative view showing the construction of a magneto-optical recording and reproducing device in a preferred embodiment of the present invention.

A preferred embodiment of the present invention is described below with reference being made to FIG. 1 and FIG. 4. As shown in FIG. 1, a magneto-optical recording and reproducing device (12) includes a magneto-optical recording medium (1) comprising a laminated substrate (1a), a magnetic substance film (1b) with perpendicular magnetic anisotropy, on the rear side of the substrate (1a), and a protective film (1c) covering the magnetic substance film (1b). To record data to this magneto-optical recording medium (1), the magneto-optical recording and reproducing device (12) comprises a data generator (9) which outputs data to be recorded, a magnetic coil driver (8) which outputs a modulated control signal based on the data output from the data generator (9), a magnetic coil (7), driven by a control signal output from the magnetic coil driver (8), which and generates an alternating magnetic field, an optical head (10) which focuses a laser beam onto the magneto-optical recording medium (1) and a laser driver (11).

The optical head (10) is equipped with a laser beam source (2) which emits a laser beam, a condensing lens (4) which focuses the laser beam by condensing the laser beam on the magnetic substance film (1b) of the magneto-optical recording medium (1), a beam splitter (3) which changes the advancing direction of the light reflected from the magneto-optical recording medium (1) and directs the light to a photodetector (5), and a photodetector (5) which detects the strength (i.e., intensity) of the reflected light.

The laser beam source (2) of the optical head (10) is set to be driven by the laser driver (11). In laser driver (11), the data output from the data generator (9) is input. When data is recorded on the magneto-optical recording medium (1), the laser driver (11) functions with means to control the laser beam output level. That is, in order to make the width of the positive magnetized parts formed by magnetizing the magnetic film (1b) in the fixed direction larger than the width of the negative magnetized parts formed by magnetizing it in an opposite direction to that of the positive magnetized parts, the laser driver (11) makes the laser beam output level when forming the positive magnetized parts higher than the laser beam output level at forming the negative magnetized parts.

In this structure, when the data is recorded on the magneto-optical recording medium (1), the laser beam emitted from the laser beam source (2) is directed through the beam splitter (3), the condensing lens (4) and the substrate (1a) of the magneto-optical medium (1), and focuses onto the magnetic substance film (1b) of the magneto-optical recording medium (1).

Then the local area of the magnetic substance film (1b) of the magneto-optical recording medium (1) onto which the laser beam is focused rises in temperature, the coercive force is decreased, and the magnetized direction can be easily changed.

Figure 2:
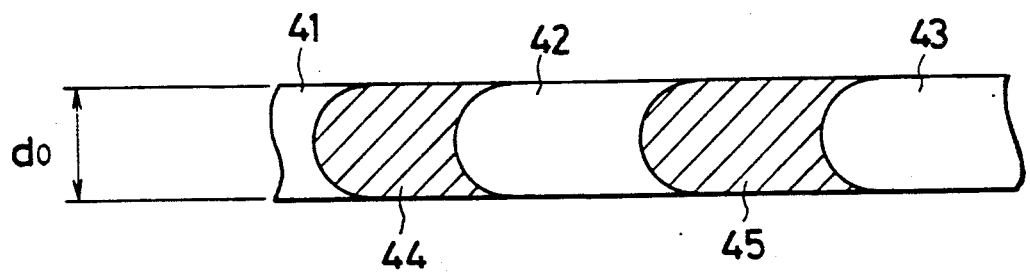
FIG. 2 is an illustrative view showing the condition of a positive magnetized area and a negative magnetized area formed on a magnetic substance film of the magneto-optical recording medium used with the magneto-optical recording and reproducing device of the present invention.

As shown in FIG. 2, if the magnetic field which is alternated based on the coded data output from the data generator (9) as generated from the magnetic coil (7), the positive magnetized area (41-43) which is made of the previous positive magnetized parts magnetized in a fixed direction, and the negative magnetized area (44-45) which is made of the negative magnetized parts magnetized in the opposite direction on the laser beam spot area, will be formed on the magnetic substance film (1b) of the magneto-optical recording medium (1). Data is recorded and reproduced based on the existence or absence of negative magnetized parts. In other words, data is recorded and reproduced based on the existence or absence, length, and location, of the negative magnetized areas (44-45).

Figure 4:
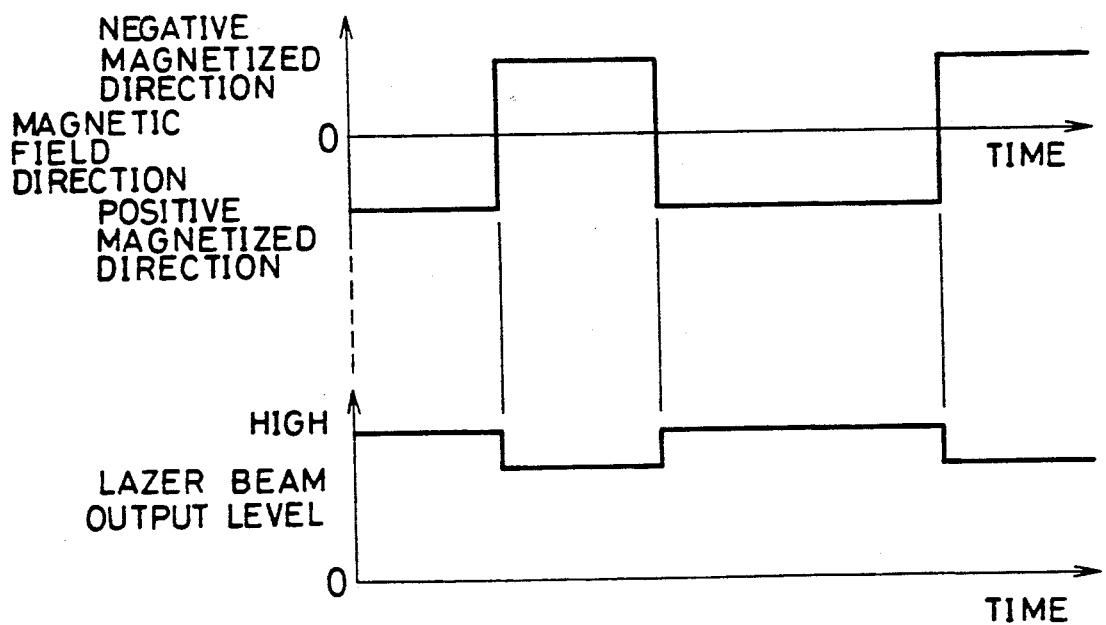
FIG. 4 is a time chart showing the relationship between a magnetic field direction generated by a magnetic coil and a laser beam source output level of a magneto-optical recording and reproducing device of the present invention.
Figure 5:
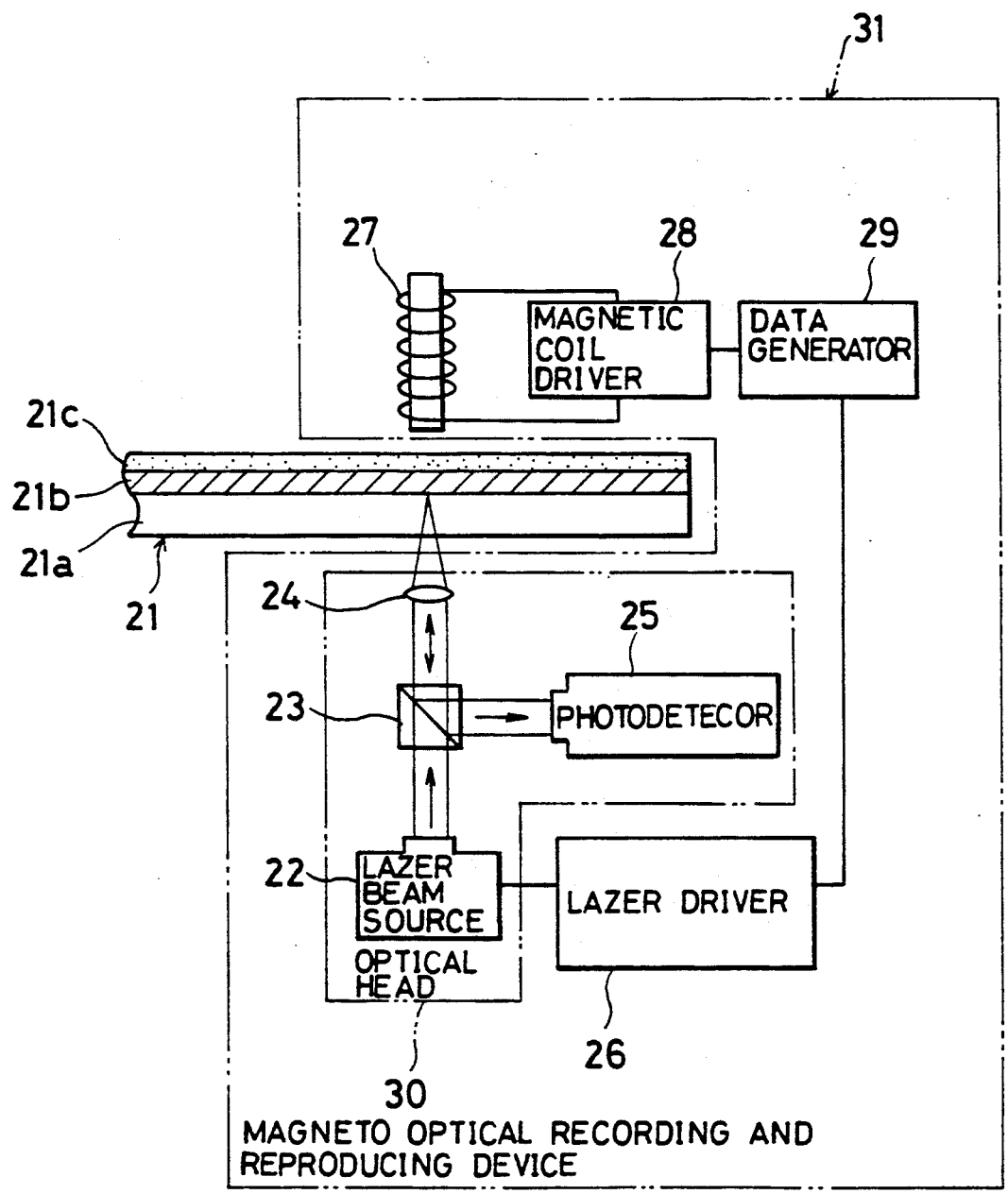
FIG. 5 is an illustrative view showing the construction of a conventional magneto-optical recording and reproducing device.
Figure 6:
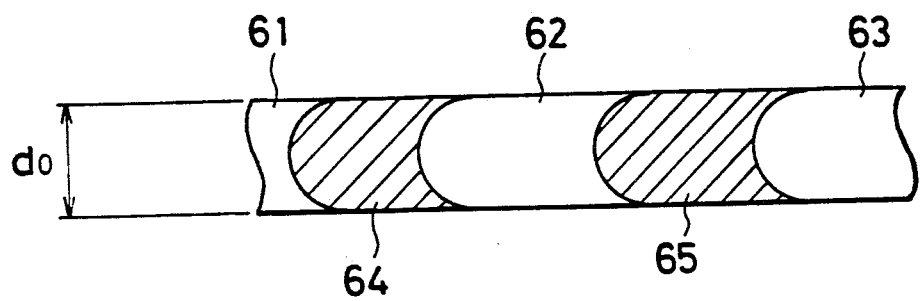
FIG. 6 is an illustrative view showing the condition of a positive magnetized area and a negative magnetized area formed on a magnetic substance film of a magneto-optical recording medium by a conventional magneto-optical recording and reproducing device.
Figure 7:
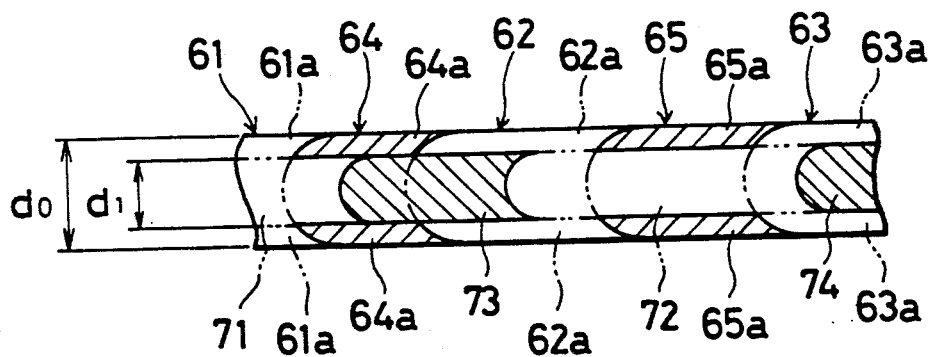
FIG. 7 is an illustrative view showing the condition of a positive magnetized area and a negative magnetized area, based on new data formed on the area where a positive magnetized area and a negative magnetized area have already been formed on a conventional magnetic substance film of a magneto-optical recording medium.

With reference to FIG. 4, the laser driver (11) increases the output level of the laser beam source (2), as the direction of the magnetic field, generated by the magnetic coil (7) based on the data output from the data generator (9), is in the direction for forming the positive magnetized parts on the magnetic substance film (1b) of the magneto-optical recording medium (1), as compared to the output levels for forming the negative magnetized parts. Because of this output level increase, the width of the positive magnetized area (41-43) becomes somewhat larger than the width $d_0$.

Figure 3:
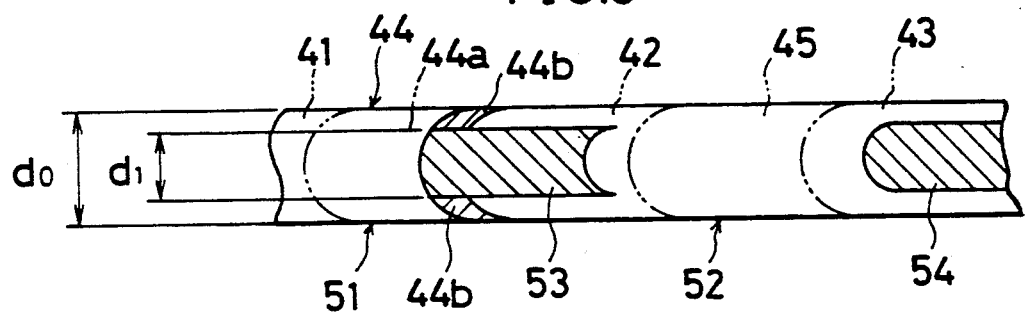
FIG. 3 is an illustrative view showing the condition of a positive magnetized area and a negative magnetized area, based on new data formed on the area where a positive magnetized area and a negative magnetized area have already been formed on a magnetic substance film of the magneto-optical recording medium used with a magneto-optical recording and reproducing device of the present invention.

On the other hand, the width of the negative magnetized area (44-45), formed on the magnetic substance film (1b) of the magneto-optical recording medium (1) does not always become fixed, because of the changes in the laser beam output levels emitted from the laser beam source (2), and changes in the sensitivity of the magneto-optical recording medium (1). Therefore, when recording is new data is, called "rewriting", on an area where the data had been previously recorded with a width of more than $d_0$ in a positive magnetized area (41-43) or a width $d_0$ in the negative magnetized area (44-45) on the magnetic substance film (1b) of the magneto-optical recording medium (1) as shown in FIG. 3, the width $d_1$ of the negative magnetized area (53-54), formed based on new data, may become smaller than the width $d_0$ previously formed in the negative magnetized area (44-45).

Even in such a case, however, when the positive magnetized area (51-52) is formed based on new data, the laser driver (11) controls the laser beam source (2) to output at a higher level, based on the data output from the data generator (9), as mentioned above. Therefore, the width of the new positive magnetized area (51-52) also becomes larger than the width $d_0$. Hence, the front end side area (44a) of the negative magnetized area (44) in width $d_0$ and the negative magnetized area (45), already formed in the area where the positive magnetized area (51-52) is newly formed, turn to become the positive magnetized area (51-52) without fail, with no residual part left.

Also, in both areas of the newly formed negative magnetized area (53), residual negative magnetized area (44b—44b) occurs. This part is bigger than the width $d_1$ of the negative magnetized area (53) in the already formed negative magnetized area (44). However, residual negative magnetized area (44b—44b) does not remain, unless in the range where the negative magnetized area (53) is to be formed. Therefore, in the magneto-optical recording and reproducing device (12), in which recording and reproducing the data is done according to the existence or absence of a negative magnetized part, that is, according to the existence or absence, length, and location, of the negative magnetized area (53-54), it is impossible for the residual negative magnetized area, which is a part of the negative magnetized area formed based on old data, to become the cause for the false signal or the error detection.

Consequently, the influence of already recorded data can be prevented without fail when the rewrite is done and the reliability of recording and reproducing data can be improved.

As mentioned thus far, the magneto-optical recording and reproducing device related to this invention is arranged so that the laser beam source, is equipped with an optical head, which focuses the laser beam onto the magnetic substance film of the magneto-optical recording medium with perpendicular magnetic anisotropy, and a magnetic coil which generates an alternating magnetic field based on data to be recorded. The magneto-optical recording and reproducing device forms on the magnetic substance film of the magneto-optical recording medium the positive magnetized parts which is being magnetized in a fixed direction, and the negative magnetized parts which is being magnetized in the direction opposite to that of the positive magnetized parts. The device records and reproduces data according to the existence or absence of the negative magnetized part. The device also includes, a means for laser beam source output control equipped to increases the laser beam source output level when forming the positive magnetized parts higher than when forming the negative magnetized parts when data is recorded, so that the width of the positive magnetized part becomes wider than the width of the negative magnetized parts.

The magneto-optical recording and reproducing device of the present invention also comprises a data generator which outputs data to be recorded on the magneto-optical recording medium, the magnetic coil driver which outputs the modulated control signals based on data output from the data generator, a magnetic coil, which is driven by the control signal output from the magnetic coil driver and generates an alternating magnetic field, the optical head which focuses a laser beam onto the magneto-optical recording medium, and the laser driver which drives the laser beam source of the optical head and enters the data from the data generator. The device further comprises a control means for the laser beam output level, which makes the laser beam source output level when forming the positive magnetizing parts higher than that when forming the negative magnetizing parts, when data is recorded to the magneto-optical recording medium. Therefore, the width of the positive magnetized part, formed by magnetizing in a fixed direction on the magnetic substance film of the magneto-optical recording medium, becomes wider than the width of the negative magnetized parts, formed by magnetizing in the opposite direction to that of the positive magnetized parts. This is the special feature of this device.

By using such a magneto-optical recording and reproducing device, even if the width of the positive magnetized area or the negative magnetized area to be formed changes, due to changes of the laser beam output level emitted from the laser beam source, or due to changes of the sensitivity of the magneto-optical recording medium, it will be impossible to leave a part of the already formed negative magnetized area on both sides of the newly formed positive magnetized area.

Therefore, when the data is reproduced, that was recorded based on the existence or absence of the negative magnetized parts, that is, based on the existence or absence, length, and position, of a negative magnetized area made of a negative magnetized parts, this device can prevent the false signals and the incorrect detection caused by the influence of the residual reversed magnetized areas, which is a part of the reversed magnetized area formed based on the old data. Consequently, the effect is that the reliability of recording and reproducing data will be unquestionably improved.

What is claimed is:

1. A magneto-optical recording and reproducing device using modulation of intensities of a magnetic field and a light beam, comprising:
    data generation means for releasing coded data to be recorded on a magneto-optical recording medium;
    magnetic coil drive means for releasing a magnetic field control signal modulated according to the coded data entered from the data generation means;
    magnetic coil means for generating an alternating magnetic field to be driven by the magnetic field control signal released from the magnetic coil drive means, the magnetic field having two directions, namely, a positive magnetization direction for forming a positive magnetized area on the magneto-optical recording medium and a negative magnetization direction for forming a negative magnetized area thereon;
    optical head means for converging a laser beam on the magneto-optical recording medium, the optical head means including a laser beam source; and
    laser beam output level control means for releasing to the laser beam source a laser beam source drive signal modulated according to the coded data entered from the data generation means,
    whereby the laser beam output level control means increases an intensity of the laser beam to be projected onto the magneto-optical recording means when a direction of a magnetic field applied to the magneto-optical recording medium by the magnetic coil means is identical to the positive magnetization direction in comparison with an intensity of the laser beam to be projected onto the magneto-optical recording medium when a direction of a magnetic field applied to the magneto-optical recording medium by the magnetic coil means is identical to the negative magnetization direction.

2. A magneto-optical recording and reproducing device according to claim 1, wherein said laser beam output level control means further comprises laser beam driver means for driving said laser beam source responsive to said laser beam output level control means.

3. A magneto-optical recording and reproducing device according to claim 1, wherein said laser beam output level control means causes said laser beam driver to drive said laser beam source for causing the width of said positive magnetized parts to be wider than the width of said negative magnetized parts when a direction of a magnetic field applied to the magneto-optical recording medium by the magnetic coil means is identical to the positive magnetization direction in comparison with an intensity of the laser beam to be projected onto the magneto-optical recording medium when a direction of a magnetic field applied to the magneto-optical recording medium by the magnetic coil means is identical to the negative magnetization direction.

4. A magneto-optical recording and reproducing device according to claim 1, wherein said laser beam source further comprises a condensing lens for focusing said laser beam spot onto said magneto-optical recording medium by condensing the laser beam, a beam splitter for changing the advancing direction of a reflected light from said magneto-optical recording medium, and a photodetector means for detecting intensity of said reflected light through said beam splitter.

5. A magneto-optical recording and reproducing device according to claim 1, further comprising:
   laser beam driver means for driving said laser beam source responsive to said laser beam output level control means; and
   data generator means for outputting coded data to be recorded in said magneto optical recording medium.

6. A magneto-optical recording and reproducing device according to claim 1, wherein said recording and reproducing of data is determined by the existence or absence of said negative magnetized parts.

7. A magneto-optical recording and reproducing device according to claim 6, wherein said recording and reproducing of data is determined by the dimensions of said negative magnetized parts.

8. A magneto-optical recording and reproducing device comprising: data generator means for outputting data to be recorded to a magneto-optical recording medium;
   a magnetic coil driver means for outputting modulated control signals according to data output from said data generator means;
   a magnetic coil means for generating an alternating magnetic field driven by the control signals from said magnetic coil driver; and
   optical head means for focusing a laser beam onto said magneto-optical recording medium; and
   laser driver means for driving a laser beam source, said laser driver comprising a laser beam output level control means for controlling the intensity of said laser beam for forming positive magnetized parts on said magneto-optical recording medium in a predetermined direction more strongly than when forming negative magnetized parts, said negative parts being magnetized in an opposite direction to said positive magnetized parts, so that the width of said positive magnetized parts becomes wider than said negative magnetized parts when recording data in the magneto-optical recording medium responsive to said data generator and said laser driver.

9. A magneto-optical recording and reproducing device according to claim 8, wherein said optical head comprising a laser beam source for emitting a laser beam, condensing lens for focusing said laser beam onto said magneto-optical recording medium by condensing the laser beam, a beam splitter for changing the advancing direction of a reflected light from said magneto-optical recording medium, and a photodetector means for detecting the intensity of said reflected light through said beam splitter.

* * * * *